(12) United States Patent
Molander (10) Patent No.: US 6,601,988 B2
(45) Date of Patent: Aug. 5, 2003

(54) SIMPLIFIED METHOD FOR SETTING TIME USING A GRAPHICAL REPRESENTATION OF AN ANALOG CLOCK FACE

(75) Inventor: Mark E. Molander, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 09/811,926

(22) Filed: Mar. 19, 2001

(65) Prior Publication Data

US 2002/0131331 A1 Sep. 19, 2002

(51) Int. Cl.[7] .......................... G04C 9/00; G04C 17/00; G04B 19/00
(52) U.S. Cl. .................. 368/187; 368/223; 368/239
(58) Field of Search .................. 368/10, 69, 82–84, 368/185–187, 223, 239, 242; 345/156, 159, 160, 163

(56) References Cited

U.S. PATENT DOCUMENTS

| 5,247,284 A | 9/1993 | Fleming | ..................... 345/156 |
|---|---|---|---|
| 5,487,054 A | 1/1996 | Capps et al. | ................. 368/185 |
| 5,583,833 A | 12/1996 | Capps et al. | ................. 368/185 |
| 6,097,390 A | * 8/2000 | Marks | ......................... 345/348 |
| 6,201,769 B1 | * 3/2001 | Lewis | ......................... 368/10 |

OTHER PUBLICATIONS

IBM Technical Disclosure Bulletin, "New Method of Setting Time by One Mouse Operation", vol. 40, No. 03, Mar. 1997.

* cited by examiner

*Primary Examiner*—Vit Miska
(74) *Attorney, Agent, or Firm*—Gerald R. Woods (57) ABSTRACT

Time values (hour, minute, AM/PM parameter) can be simply and quickly set in a computer system using a graphical representation of a circular analog clock face. Time setting zones (hour-indicative sectors and minute-indicative subsectors) are defined on the displayed clock face. A user selects an hour and a minute value in a single point-and-click operation by moving a cursor into the appropriate subsector within the appropriate sector and then performing a cursor select operation. Two different approaches are described for choosing an AM or a PM parameter to be associated with the selected time value.

26 Claims, 5 Drawing Sheets

SIMPLIFIED METHOD FOR SETTING TIME USING A GRAPHICAL REPRESENTATION OF AN ANALOG CLOCK FACE

FIELD OF THE INVENTION

The present invention relates to a computer system having a graphical user interface and more particularly to a graphical user interface which supports entry of time values using a graphical representation of an analog clock face.

BACKGROUND OF THE INVENTION

Computer systems commonly employ time-of-day clock values (time values) for a number of different purposes. As just two examples, time values may be used to control system operations such as automated backups or for calendaring functions, such as scheduling user appointments or setting the start and stop times of meetings. In most cases, the user is required to enter the appropriate time values.

In character-based (non-graphic) systems, a user can type in a time command, which may generate a prompt directing the user to type in the appropriate time value. This technique has a couple of disadvantages. For one thing, it requires that the user can remember the syntax and semantics of the time command and the format to be used for entering the values. For another thing, it places a premium on the user's typing ability.

Graphical user interfaces have been developed to make it easier for users to perform many computer functions, including the entry of time values. A number of different techniques have been developed for allowing the user to enter digitally-represented time values through graphical user interfaces. According to one straightforward approach, a user initiates a time setting sequence by selecting a date/time icon in the graphical user interface. The system responds to the icon selection by displaying time and date fields which the user can fill in or complete by keying in appropriate time and/or date information. While this approach is a slight improvement over the character-based approach described above, it still requires that the user know the format in which data must be entered and it still places a premium on the user's typing ability.

According to another approach, the system may respond to selection of a date/time icon by generating a display of a digital clock face with hour, minute, second and AM/PM fields. The user then enters the time value by using a mouse to select the appropriate field before keying in the desired data. When the term "mouse" is used in the following description, it should be construed as referring to any instrumentality capable of controlling the screen position of a cursor and performing select operations. Examples of some, but not all, of the currently available instrumentalities with this capability include roller-ball mouses, optical mouses, trackballs, Trackpoint controllers, joysticks, touch-sensitive pads and even programmed keyboards.

Still another approach uses a visual digital scale that shows at least part of a 24-hour time cycle. A user can select a time value on the scale by using a mouse to select and move the image of a slider into alignment with the desired time value. Where this technique is used in a calendaring application, two sliders may appear on the same digital scale. The first slider is used to select the start time for a meeting or other appointment while the second slider is used to select the stop time. Some users find it difficult to align a slider with a desired time value without overshooting the desired value one or more times before the image of the slider comes to rest in the right spot. Moreover, where the two sliders are on the same digital scale, their images visually "collide" when the user tries to set up a brief meeting by moving the second slider close to the first one. A user may be forced to key in a stop and/or start times for a brief meeting because of this image "collision" problem.

Still another approach uses digital representations of time values appearing in fields flanked by "spin buttons" or up/down arrows. When the user initiates the time setting operation, the user may alter the time shown in the time field by selecting and "holding down" either the up or the down spin button. If the time field changes rapidly when the user holds down a spin button, the user may repeatedly overshoot the desired value while he "hunts" down the desired value. If the time field is made to change slowly to prevent overshooting, the user may become frustrated waiting by the apparent delays in system response.

What all of the graphical techniques described above have in common, other than the indicated usability drawbacks, is that all represent time values that are represented digitally; that is, in numeric form. A significant number of users are more comfortable visualizing time values in an analog form, such as on a circular clock face with an hour hand, a minute hand and (usually) hour-indicating indicia or numbers.

A number of techniques have been developed for users who are more comfortable operating in what could be called an analog time domain. One of these techniques uses a round clock face with hour and minute hands and hour-indicating indicia. An annular region is defined as surrounding a circular area which is centered on but does not occupy all of the clock face. To set an hour value, the user employs a mouse to move a cursor to the desired hour-hand position within the circular area. The hour value is fixed when the user clicks and releases a mouse button. Similarly, the minute value is set by moving the cursor to the desired position in the surrounding annular region. Again, the minute value is fixed by clicking a mouse button. While this approach is much simpler than most of the digital approaches previously described, it nevertheless still requires two point-and-click operations, one for setting the hour and the other for setting the minute.

Still another approach, developed primarily for pen-based systems, requires analysis of the movement of a stylus across a touch-sensitive screen showing a round analog clock face. The stroke analysis determines whether the hour hand or the minute hand is to be set and the value to which the hand is to be set. This approach is somewhat more difficult to implement than the previously described approaches because of the requirement for stroke analysis. It also requires that a user learn the types of strokes which can be used.

According to another approach using an analog clock face, a user may use a left mouse button to set the desired position of the hour hand and the right mouse button to set the desired position of the minute hand. Since selecting an object in the graphical user interface with a right mouse button ordinarily activates a pulldown menu, the potential exists for a software conflict Finally, according to a last approach, the user selects a desired hour value simply by moving a cursor onto the clock face at the desired hour position. Minute values can be changed by repeatedly clicking the mouse button while the cursor remains positioned over the clock face. According to one embodiment of the invention, the minute value changes in five minute steps every time the mouse button is pressed and released. The steps can be changed from five minutes to one minute by holding down a Control key while clicking the mouse button.

SUMMARY OF THE INVENTION

The present invention is an extremely simple method for entering hour and minute time values in a single click operation.

An analog clock face with an hour hand, a minute hand and possibly hour-indicating indicia is shown on the display screen. A time setting zone is defined which is centered on the clock face and divided into a number of sectors equal to the number of hours represented on the clock face. If the clock is a conventional 12 hour clock, twelve sectors are defined. To set the desired hour and minute values, the user employs a mouse to move a cursor into one of the twelve sectors. The hour value is set to a value associated with the sector in which the cursor is located when a cursor select operation is performed. The minute value is set as a function of the location of the cursor within the sector when the cursor select operation is performed.

BRIEF DESCRIPTION OF THE DRAWINGS

While the specification concludes with claims particularly pointing out and distinctly claiming that which is regarded as the present invention, details of preferred embodiments of the invention may be more readily ascertained from the following technical description when read in conjunction with the accompanying drawings wherein:

TECHNICAL DESCRIPTION

Figure 1:
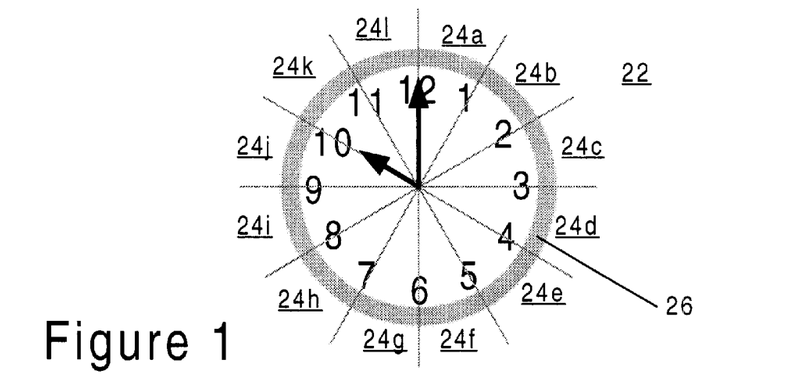
FIG. 1 is a graphical representation of an analog clock face showing a sectored time setting zone required for the use of the present invention.

FIG. 1 shows a round analog clock 22 of the type suitable for use with the present invention. As is conventional, the clock includes an hour hand, a minute hand and hour-indicating indicia; in this case, the numbers 1 through 12. The face of the clock is subdivided into a number of sectors 24a through 24l. Each sector begins at a point on the periphery which is aligned with one of the hour-indicating indicia and ends at a point on the periphery which is aligned with one of the adjacent hour-indicating indicia. The number of sectors corresponds to the number of hours represented on the clock face; typically, twelve. If the clock had been one of those relatively uncommon clocks capable of displaying time in twenty-four hour format, the clock face would have been divided into twenty-sectors instead of twelve. An annular "time setting" zone 22 is defined approximately at the periphery of the clock face. The sector boundaries and the time setting zone are represented visually in order to describe how the invention operates. In practice, it would be possible to greatly de-emphasize or even eliminate any display of the sector boundaries or time setting annulus without changing how the invention operates.

Figure 2:
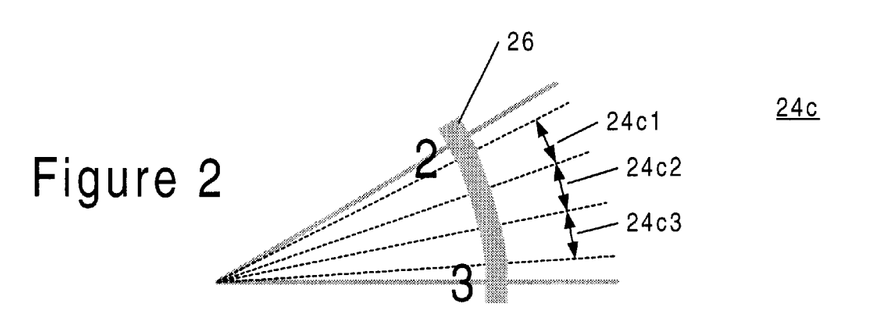
FIG. 2 is an enlarged view of one of the sectors of the clock face.

Each of the sectors on the clock face is, in turn, divided into subsectors representing specific minute values. Referring to FIG. 2, sector 24c is shown as having three complete subsectors 24c1, 24c2 and 24c3 representing, respectively, minute values of :15, :30, and :45.

FIG. 1 shows a current time of 10:00. In accordance with the present invention, a user can readily set that time value to any desired, new value in a single click operation. Assume the user wanted to reset the time to 2:15. To change the hour value from 10 to 2, the user employs a mouse to move a cursor into that sector in time setting zone 26 which is associated with the hour value; that is, into sector 24c. To change the minute value from :00 to :15, the user moves the cursor into the subsector within sector 24c associated with the :15 minute value; that is, into subsector 24c1 shown in FIG. 2. The displayed positions of the clock hands preferably change "on the fly" to the hour and minute values associated with the current cursor position as long as the cursor remains within the time setting zone while it is moving. Changing the clock hands "on the fly" provides positive feedback to the user permitting him to verify that he is selecting the intended time. Another alternative would be to leave the current time settings unchanged while concurrently showing new hand positions "on the fly" using a second set of hands in a different color or with a different emphasis in order to distinguish them from the original hands.

Figure 3:
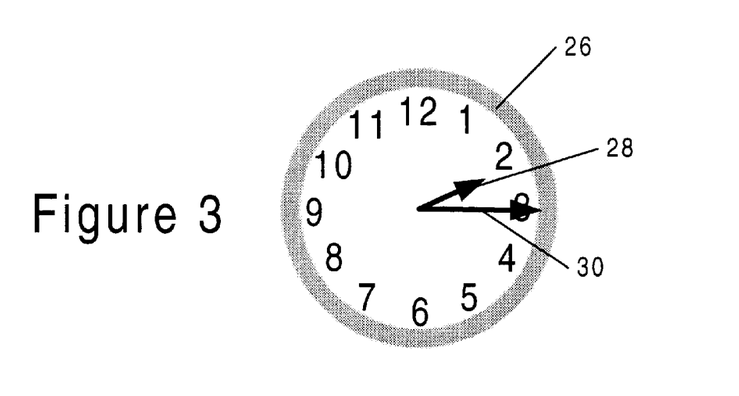
FIG. 3 is a representation of a clock face showing the new positions of hour and minute hands following a time setting operation described with reference to FIGS. 1 and 2.

When the user has selected the intended time by positioning the cursor at the appropriate position in the time setting zone, he can "lock in" the new time by performing a standard select operation such as pressing and releasing a mouse button. FIG. 3 shows the analog clock face with the hour and minute hands set to the new positions through use of the single click operation described above. Where the alternative described above is employed, the "lock in" operation would also cause the original hands to disappear the the new hands to take on the graphical attributes of the original hands.

No mention has been made thus far of the fact that setting a time value using a 12 hour clock face is inherently ambiguous in that the numeric values (or the appearance of the hour hand and minute hand) per se cannot indicate whether the time is intended to be between midnight and noon (AM) or between the noon and midnight (PM). The ambiguity can be resolved in different ways, only two of which will be described. One of the described ways requires an extra point-and-click operation. The other does not.

Figure 4:
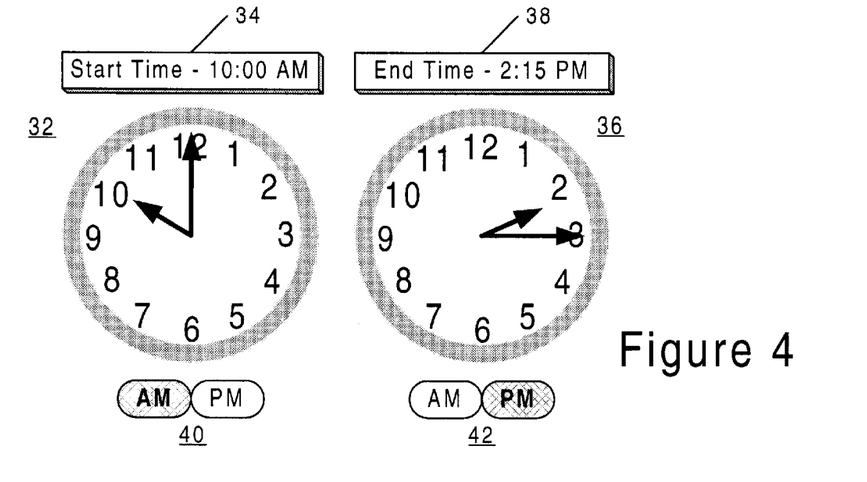
FIG. 4 is a graphical representation of clock which can be used to set start and stop times in a calendering application.

FIG. 4 is a graphical representation of a two clock system which can be employed to allow users to readily set a start time and then in time in a calendering application. A start time clock 32, identified by an appropriate legend 34, and end time clock 36, identified by its own legend 38, are functionally identical and operate independently of one another. The only difference between the two clocks, other than the descriptive legends, is the use made of the time value set on each clock. using the steps already described with reference to FIGS. 1 and 2.

In the system shown in this Figure, the inherent ambiguity as to whether a set time value represents an AM or PM value is resolved through the use of displayed AM/PM indicator fields 40 and 42 associated with clocks 32 and 36, respectively. When either clock 32 or clock 36 has been set to a desired time value, the user can assign the appropriate AM or PM parameter by moving the cursor to the appropriate region of the associated AM/PM indicator field and performing a select or click operation.

Figure 5:
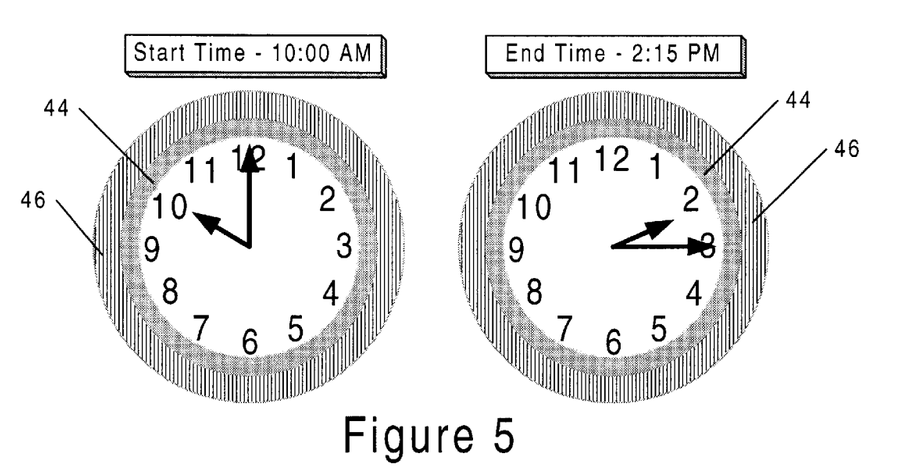
FIG. 5 is a graphical representation of an alternate arrangement for setting start and stop times.

FIG. 5 depicts an alternate embodiment of the invention which can resolve an AM/PM ambiguity without using the AM/PM indicator fields described above and without the need for a separate point-and-click operation. In this alternate embodiment, two concentric time setting zones 44 and 46 are defined for each clock in the system. To set an AM time value, a user moves the cursor within the smaller annular zone 44. When the user selects the desired time and locks it in by performing a click or select operation, the system makes use of the fact that the cursor is in zone 44 to automatically assigns the AM parameter. A PM time value is set the same way by keeping the cursor in the second annular zone 46. Since the two zones are contiguous, it may be useful to have the system constantly show either an AM or PM legend during the time setting operation to provide visual feedback to the user as to whether he has the cursor in the right zone.

In the system described so far, a user is limited to setting time values in 15 minute increments. For the majority of calendering applications, this does not pose a signficant problem since appointments or meetings are rarely scheduled on anything other than 15 minute increments. In a few applications, such as setting system times, it may be more important to be able to adjust the minute hand to the nearest desired minute.

Figure 6:
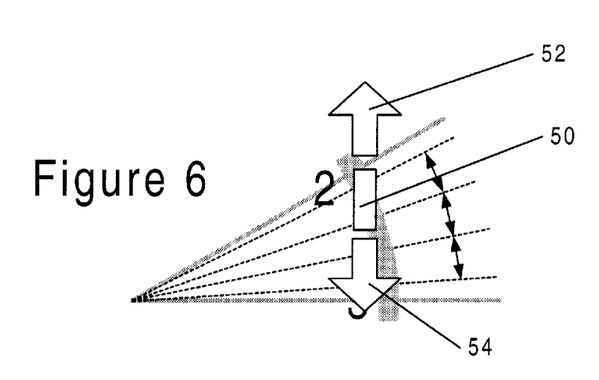
FIG. 6 is an enlarged view of a sector showing how minute values can, in one embodiment of the invention, be adjusted in small increments.

FIG. 6 illustrates an alternate embodiment of the invention which makes this possible. In the previously described embodiments, the user selected the appropriate hour and minute values by moving the cursor to the appropriate subsector within the appropriate sector and then performing a select or click operation. In the alternate embodiment, the user selects the appropriate hour value and a minute value somewhat near the desired final minute value by positioning the cursor in the manner described above. Once the cursor is in that position, represented by cross 50, the user presses and holds down the mouse button while moving the cursor up (in the direction of arrow 52) to reduce the minute value by one minute steps or down (in the direction of arrow 54) to increase the minute value by one minute steps. When the desired minute value is achieved, the user locks in the time setting by releasing the mouse button.

Figure 7:
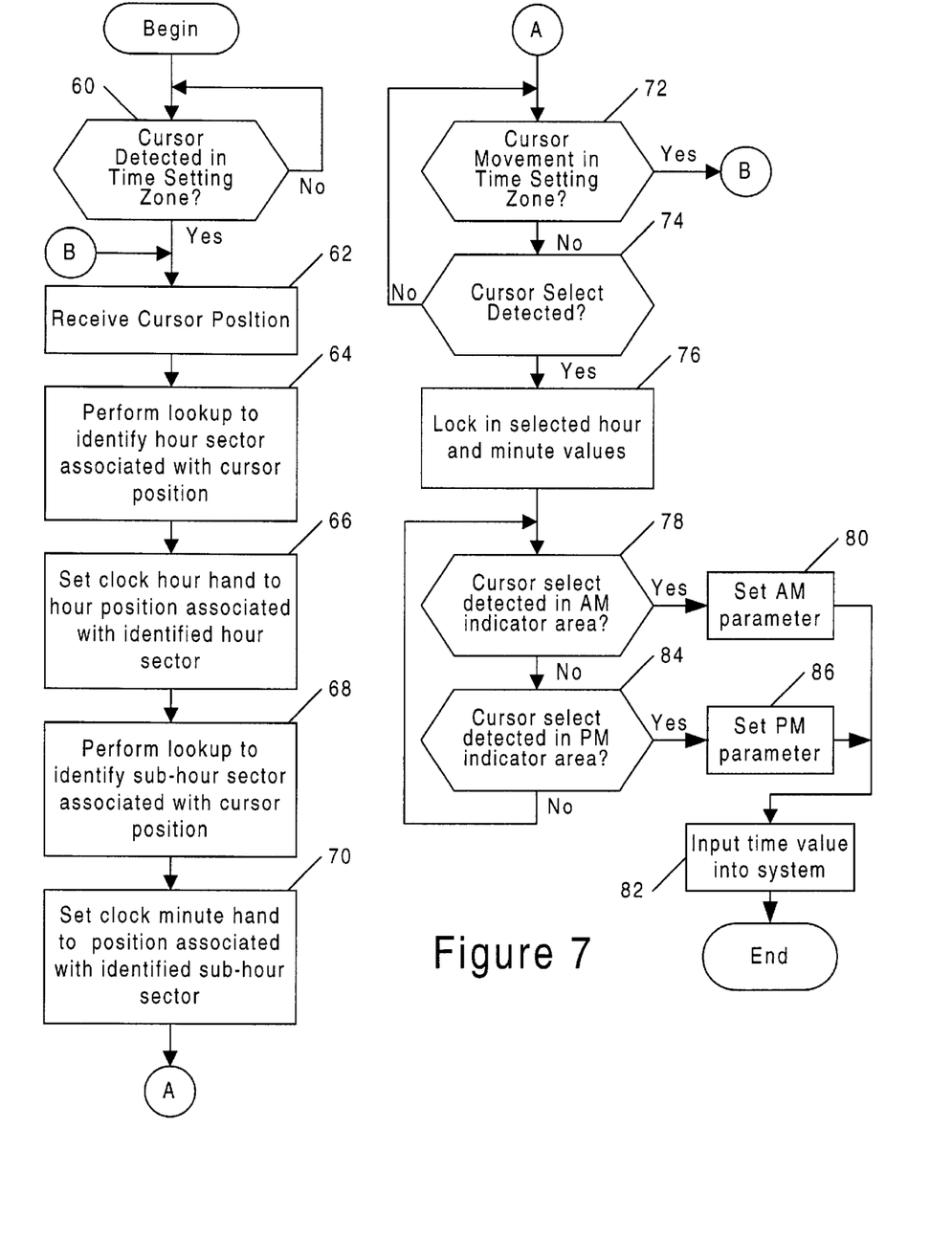
FIG. 7 is a flowchart of the basic steps of a time setting method implementing the present invention.

FIG. 7 is a flow chart of steps performed in executing the time setting method generally described with reference to FIGS. 1 and 2. The time setting method itself can be called up by a user in several well-known ways, such as by clicking on a date/time icon in a graphical user interface or by selecting a date/time menu entry on a pulldown menu. Once the preliminary step of calling the time setting routine is completed, the time is initiated when an operation 60 detects the presence of a cursor in the defined time setting zone on a clock face appearing on the computer system display screen. The cursor position is returned to the system in an operation 62 and a lookup operation 64 is performed to identify the hour sector associated with that cursor position. The hour hand on the displayed clock face is changed to the hour value associated with the identified sector in an operation 66. A second lookup operation 68 is performed to identify the sub-hour sector or simply subsector in which the cursor is currently located. The minute hand on the displayed clock face is set to the minute value associated with the identified subsector in an operation 70.

The system continually tracks the cursor position in an operation 72. If the cursor changes positions within the time setting zone, steps 62 through 70 are repeated to adjust the time values (and displayed hour and minute hand positions) on the fly. If no cursor movement is detected in operation 72, a check 74 is performed to determine whether a cursor select operation (for example, pressing and releasing a left mouse button) has been performed. Until a cursor select operation is detected, the program operates in a loop consisting of operations 72 and 74 with operations 62 through 70 being invoked each time cursor movement is detected in operation 72.

When a cursor select operation is detected, the selected hour and minute values are locked in in an operation 76 and the system begins the steps required to resolve the AM/PM ambiguity. Operation 78 looks for a cursor select operation performed while the cursor is in the AM indicator area. If such a cursor select operation is detected, an AM parameter is assigned to the time value in operation 80 and the complete time value (hour, minute, AM parameter) is input into the computer system in an operation 82. If a cursor select is not detected while the cursor is in the AM indicator area, a similar operation 84 is performed to see if a cursor select has occurred while the cursor is in the PM indicator area. If a PM area cursor select is detected, the PM parameter is assigned in operation 86 before the complete time value (hour, minute, PM parameter) is input into the computer system in operation 82.

Figures 8, 9:
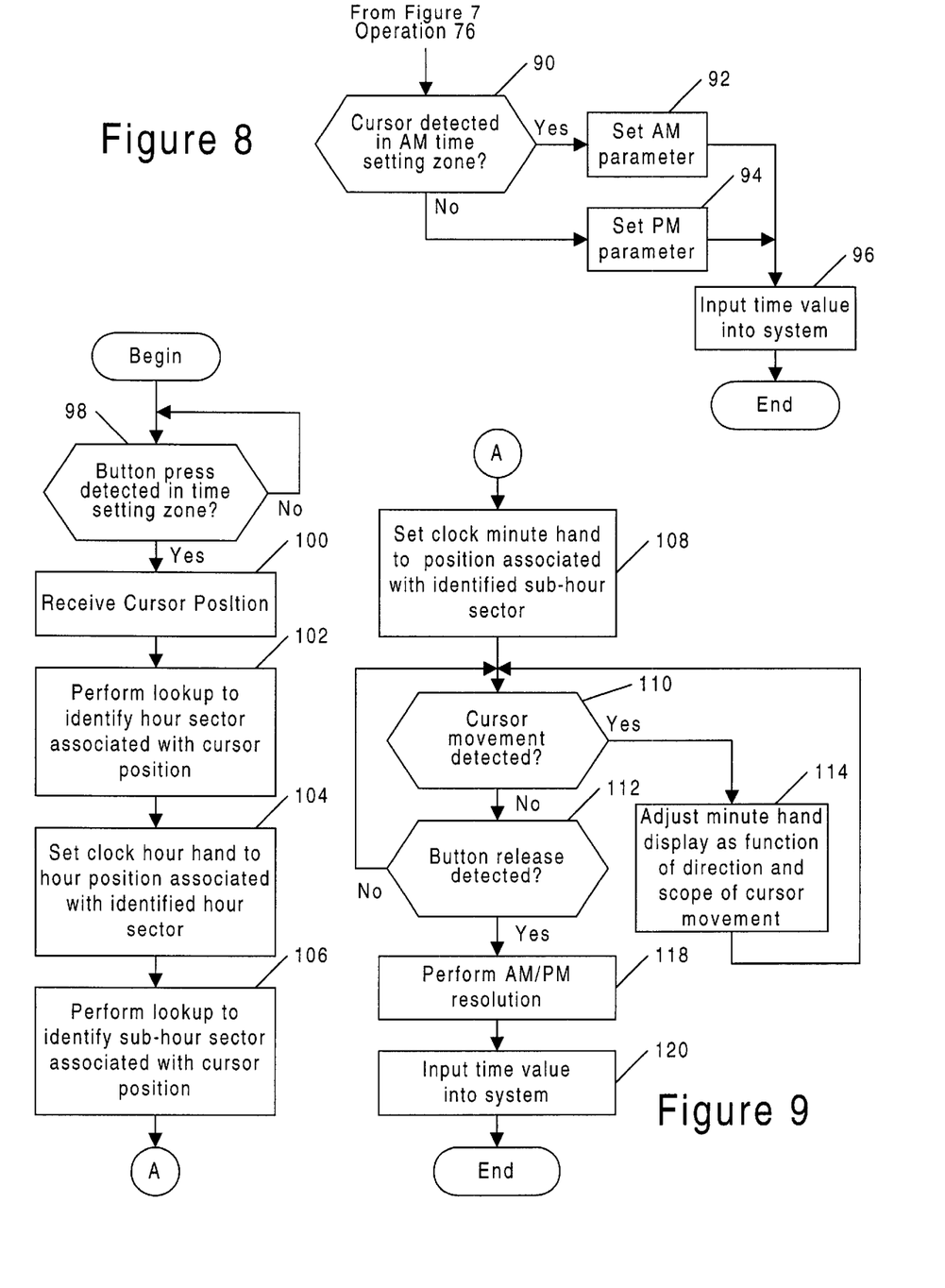
FIG. 8 is a partial flowchart showing steps that would be performed in an alternative implementation.
FIG. 9 as a flowchart of an alternate embodiment of the invention.

The method described above assumes the type of AM/PM resolution described with reference to FIG. 4. Most of the method steps remain the same if the type of AM/PM resolution described with reference to FIG. 5 is to be employed. FIG. 8 shows only the steps that are performed only where the two methods diverge. Operations 60 through 76 are common to both embodiments of the invention. Once the hour and minute values are established through these operations and are locked in (see operation 76 in FIG. 7), the system determines whether the cursor is located in the AM time setting zone 44 (illustrated in FIG. 5). If the cursor is found in the AM time setting zone, the AM parameter is set in operation 92 and the complete time value (hour, minute, AM parameter) is input into the computer system in operation 96. If operation 90 indicates that the cursor is not in the AM time setting zone, then it necessarily must be in the PM time setting zone to have reached this point in the process. The PM parameter is set in operation 94 before the complete time value (hour, minute, PM parameter) is input into the computer system in operation 96.

FIG. 9 is a flow chart of steps that are performed in implementing the embodiment of the invention generally described previously with reference to FIG. 6. Once the user invokes the time setting routine by clicking on a date/time icon or selecting a time setting entry from a pulldown menu, the computer system begins to look (operation 98) for a mouse button press which occurs while the cursor is in a time setting zone defined on the display screen. Once the button press is detected, the cursor position is input to the time setting program in operation 100. The hour-indicating sector associated with the current position is identified (operation 102) and the displayed clock hand is set to the appropriate position on the clock face (operation 104). Similar operations 106 and 108 are performed to identify the minute-indicating subsector associated with the current cursor position and to set the displayed minute hand to the desired position.

Once the initial hour and minute hand positions are established, the system detects further cursor movement in an operation 110 and adjusts the minute hand value in one minute increments in an operation 114 with the magnitude and direction (increase/decrease) being determined by the extent and direction of cursor movement. Adjustment of the minute display and value continues until an operation 112 detects that the pressed button has been released. Once button release is detected, AM/PM resolution is detected in an operation 118 using one of the previously described methods before the complete time value is input into the system in an operation 120.

Figure 10:
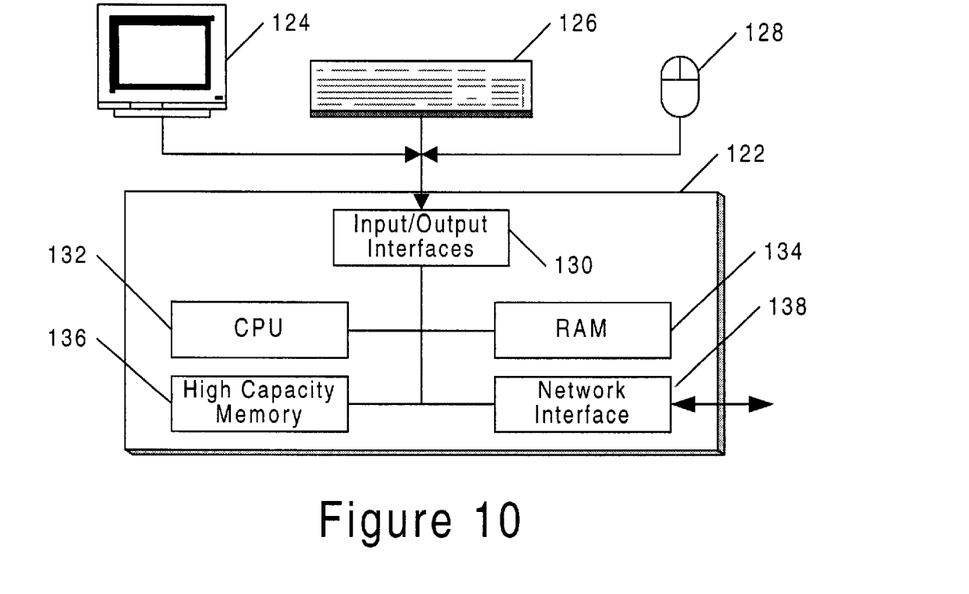
FIG. 10 is a schematic diagram of a computer system in which the present invention can be implemented.

The methods described above can be implemented in any suitable computer system. One such system is illustrated in FIG. 10 as including a system unit 122 (shown in block diagram form) with a monitor or display 124, a keyboard 126 and a pointing device such as a mouse 128. The three devices 124, 126 and 128 are connected to the system unit 122 through input/output interfaces 130 which may take the form of separate pluggable adapter cards or which may be integrated into a motherboard for the system unit. Typically, the system unit will contain RAM or random access memory 134 for storing program instructions and data during program execution and a high capacity memory 136 for providing long term non-volatile storage of programs and data. The high capacity memory can be implemented using any suitable technology, including magnetic or optical technologies with moving disks or flash memories with no moving parts. Most computer systems in business use today include a network interface 138 but the presence of such an interface is not essential to practice of the invention.

Figure 11:
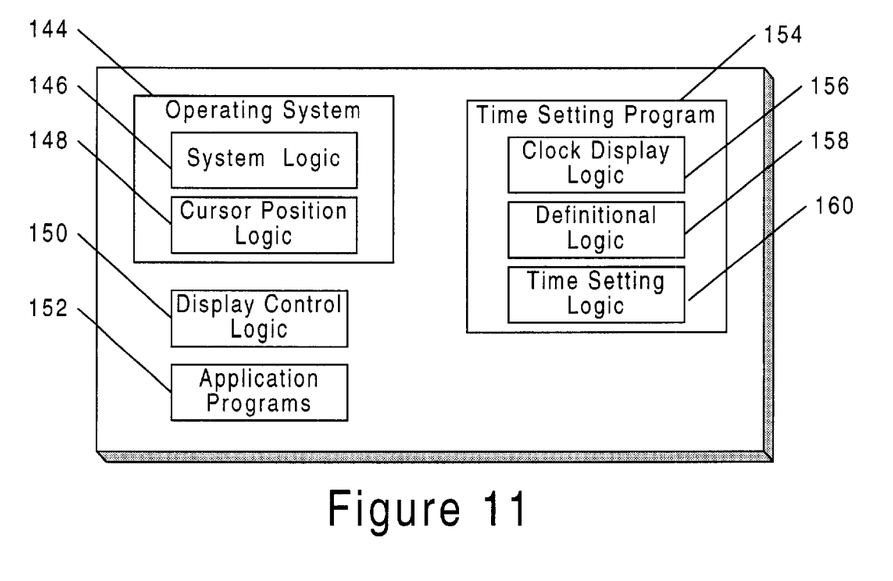
FIG. 11 is a software block diagram illustrating significant program functions required for execution of the present invention.

FIG. 11 is a block diagram of the software components which must exist in the computer system in order to implement the invention. An operating system 144 is needed. The operating system, which may be conventional in nature, must include system logic 146 for performing routine system operations and cursor position logic 148 for receiving and translating cursor positions into data usable by the remainder of the time setting program. General display control logic 150 is required to control the computer display used to present graphical representations of analog clocks. Other application programs 152 may be included in the software stored and executed in the computer system.

The time setting program 154 which actually implements the described methods includes clock display logic 156 for controlling the display of the clock faces, and any visible time setting zones or sector lines or AM/PM indicator fields. A set of definitional logic 158 is required to define the screen positions of the time setting zones and AM/PM indicator fields to the remainder of the computer system. Finally, time setting logic 160 is required to translate the cursor positions and AM/PM indications into a time value suitable for use in the computer system.

While there has been described what are considered to be preferred embodiments of the present invention, variations of those embodiments may occur to those skilled in the art. It is intended that the appended claims shall be construed to include both the preferred embodiments as well as any variations falling within the true spirit and scope of the invention.

What is claimed is:

1. For use in a computer system that includes a display screen and a user-controlled pointing device for positioning a cursor on the display screen and providing position input in response to a user-initiated pointing device select operation, a method of establishing a time value comprising the steps of:
    a) displaying an analog clock face on the display screen with an hour hand and a minute hand set to initial time values;
    b) creating a time setting zone centered on the clock face and divided into a number of sectors equal to the number of hours represented on the clock face;
    c) detecting a cursor position input resulting from a select operation while the cursor is in the time setting zone; and
    d) setting the hour hand to a time value associated with the sector within which the position input is detected and the minute hand to a time value dependent upon the location of the position input within said sector.

2. A method as set forth in claim 1 including the additional steps of
    a) creating input zones on the display screen associated with AM or PM parameters; and
    b) detecting a cursor position input occurring in one of said input zones and assigning the associated time parameter to the set time.

3. A method as set forth in claim 2 including the additional step of accepting the set time value and associated parameter into the computer system.

4. A method as set forth in claim 3 wherein the time setting zone is an annular area divided into arcuate sectors, each sector having a first radial boundary coincident with a first hour-indicating indicia on the clock face and a second radial boundary coincident with an adjacent hour-indicating indicia.

5. A method as set forth in claim 4 wherein each arcuate sector is subdivided into subsectors associated with different minute values and the detection of the position input in one of the subsectors causes the minute hand to be set to a time value associated with that sector.

6. A method as set forth in claim 5 wherein the subsectors within a sector are associated with minute values 15, 30 and 45.

7. For use in a computer system that includes a display screen, a user-controlled pointing device for positioning a cursor on the display screen, and means for generating an input signal indicative of the position of the cursor, a method of establishing a time value comprising the steps of:
    a) displaying a graphical representation of an analog clock face on the display screen, said clock face including hour-indicating indicia, an hour hand set to an initial hour time value and a minute hand set to an initial minute time value;
    b) creating at least one time setting zone centered on the displayed analog clock face, said at least one time setting zone being divided into a number of sectors equal to the number of hours represented on the clock face, each sector having one boundary coincident with a first hour-indicating indicia and another boundary coincident with an adjacent hour-indicating indicia;
    c) creating two zones on the display screen, one of said two zones being associated with an AM parameter and the other of said two zones being associated with a PM parameter;
    d) detecting an input signal resulting from a user-initiated cursor-select operation occuring while the cursor is the time setting zone;

e) setting the hour hand to a time value associated with the sector within which the cursor is positioned when the input signal is detected and the minute hand to a time value dependent upon the location of the cursor within the sector;

f) detecting an input signal resulting from a user-initiated cursor-select operation occuring while the cursor is in one of said two zones;

g) assigning either an AM or a PM parameter depending on which of said two zones the cursor was in; and h) accepting the set time value, including the assigned parameter, in the computer system.

8. A method as set forth in claim 7 wherein said two zones are polygonal buttons appearing on the display screen adjacent the clock face.

9. A method as set forth in claim 7 wherein said two zones are concentric annular zones centered on the clock face, each of said zones also constituting a time setting zone.

10. For use in a computer system that includes a display screen, a user-controlled pointing device for positioning a cursor on the display screen, and means for generating a first input signal indicative of the position of the cursor when a button on the user-controlled pointing device is depressed and a second input signal indicative of the position of the cursor when the button is released, a method of establishing a time value comprising the steps of:

a) displaying a graphical representation of an analog clock face on the display screen, said clock face including hour-indicating indicia, an hour hand set to an initial hour time value and a minute hand set to an initial minute time value;

b) creating at least one time setting zone centered on the displayed analog clock face, said at least one time setting zone being divided into a number of sectors equal to the number of hours represented on the clock face, each sector having one boundary coincident with a first hour-indicating indicia and another boundary coincident with an adjacent hour-indicating indicia;

c) creating two zones on the display screen, one of said two zones being associated with an AM parameter and the other of said two zones being associated with a PM parameter;

d) detecting a first input signal occuring while the cursor is the time setting zone;

e) upon detection of the first input signal, setting the hour hand to a time value associated with the sector within which the cursor is positioned and the minute hand to a time value dependent upon the location of the cursor within the sector;

f) detecting a second input signal occurring while the cursor is in the time setting zone;

g) setting the minute hand to a time value dependent upon the change in cursor position occuring between the detection of the first and second input signals;

h) detecting an input signal resulting from a user-initiated cursor-select operation occuring while the cursor is in one of said two zones;

i) assigning either an AM or a PM parameter depending on which of said two zones the cursor was in; and j) accepting the set time value, including the assigned parameter, in the computer system.

11. A computer system having a display with a display screen, a user-controlled pointing device for positioning a cursor on the display screen, cursor position logic for providing an input signal representing the current cursor position and a subsystem for setting time values, said subsystem comprising:

a) display logic for generating a representation of an analog clock face on the display screen, said analog clock face including hour-representing indicia, an hour hand and a minute hand;

b) definitional logic for defining a time setting zone on the display screen, said time setting zone being centered on the clock face and being divided into a number of sectors equal to the number of hours represented on the clock face;

c) time setting logic responsive to the occurrence of an input signal generated while the cursor is positioned in the time setting zone to set the hour hand to a time value associated with the sector in which the cursor is positioned at the time of the input signal and the minute hand to a time value associated within the position of the cursor within the sector; and d) system logic for entering the set time values into the computer system.

12. A computer system as set forth in claim 11 wherein said display logic is further capable of displaying indicia on the display screen which indicate whether the set time value is an AM value or a PM value, said definitional logic is further capable of defining AM/PM setting areas coincident with the displayed indicia and said time setting logic responds to the occurrence of an input signal while the cursor is positioned in one of the AM/PM setting areas to assign an AM or PM parameter to the set time.

13. A computer system as set forth in claim 12 wherein the definitional logic defines the time setting zone as an annular area divided into arcuate sectors, each sector having a first radial boundary coincident with a first hour-indicating indicia on the clock face and a second radial boundary coincident with an adjacent hour-indicating indicia.

14. A computer system as set forth in claim 13 wherein the definitional logic defines each of the arcuate sectors as being subdivided into a plurality of subsectors with each of subsector being associated with a different minute value, said time setting logic being response to a cursor being located in one of said sub sectors at the time of an input signal to set the minute hand to the minute value associated with the subsector.

15. A computer system as set forth in claim 14 wherein the definitional logic defines a first annular area as a time setting zone and AM setting area and a second concentric annular area as a time setting zone and PM setting area.

16. A computer system having a display with a display screen, a user-controlled pointing device for positioning a cursor on the display screen, cursor position logic for providing a first input signal representing the cursor position when a button on the pointing device is pressed and second input signal representing the cursor position when the button is released and a subsystem for setting time values, said subsystem comprising:

a) display logic for generating a representation of an analog clock face on the display screen, said analog clock face including hour-representing indicia, an hour hand and a minute hand;

b) definitional logic for defining a time setting zone on the display screen, said time setting zone being centered on the clock face and being divided into a number of sectors equal to the number of hours represented on the clock face;

c) time setting logic responsive to the occurrence of a first input signal generated while the cursor is positioned in the time setting zone to set the hour hand to a time value associated with the sector in which the cursor is positioned at the time of the input signal and the minute hand to a time value associated within the position of the cursor within the sector, said time setting logic further being responsive to the occurrence of a second input signal to set the minute hand to a time value dependent upon the change in cursor position occurring between the first and second signals; and d) system logic for entering the set time values into the computer system.

17. A computer program product comprising a computer useable medium having a computer readable program embodied in said medium, wherein the computer readable readable program when executed on a computer system having a display screen and a user-controlled pointing devices causes the computer system to:

a) display an analog clock face with an hour hand and a minute hand set to initial time values;

b) define a time setting zone centered on the clock face and divided into a number of sectors equal to the number of hours represented on the clock face;

c) detect a cursor position input resulting from a select operation while the cursor is in the time setting zone; and d) set the hour hand to a time value associated with the sector within which the position input is detected and the minute hand to a time value dependent upon the location of the position input within said sector.

18. A program product as defined in claim 17 which also causes the computer system to a) create input zones on the display screen associated with AM or PM parameters; and b) detect a cursor position input occurring in one of said input zones and assign the associated time parameter to the set time.

19. A program product as defined in claim 18 which also causes the computer system to accept the set time value and associated parameter.

20. A program product as defined in claim 19 wherein the the computer system is caused to define the time setting zone as an annular area divided into arcuate sectors, each sector having a first radial boundary coincident with a first hour-indicating indicia on the clock face and a second radial boundary coincident with an adjacent hour-indicating indicia.

21. A program product as defined in claim 20 wherein the computer system is caused to define each arcuate sector as being subdivided into subsectors associated with different minute values and to respond to the detection of the position input in one of the subsectors by setting the minute hand to a time value associated with that sector.

22. A program product as defined in claim 21 wherein the computer system is caused to associate subsectors within a sector with minute values 15, 30 and 45.

23. A computer program product comprising a computer useable medium having a computer readable program embodied in said medium, wherein the computer readable readable program when executed on a computer system having a display screen and a user-controlled pointing devices causes the computer system to:

a) display a graphical representation of an analog clock face on the display screen, said clock face including hour-indicating indicia, an hour hand set to an initial hour time value and a minute hand set to an initial minute time value;

b) create at least one time setting zone centered on the displayed analog clock face, said at least one time setting zone being divided into a number of sectors equal to the number of hours represented on the clock face, each sector having one boundary coincident with a first hour-indicating indicia and another boundary coincident with an adjacent hour-indicating indicia;

c) create two zones on the display screen, one of said two zones being associated with an AM parameter and the other of said two zones being associated with a PM parameter;

d) detect an input signal resulting from a user-initiated cursor-select operation occuring while the cursor is the time setting zone;

e) set the hour hand to a time value associated with the sector within which the cursor is positioned when the input signal is detected and the minute hand to a time value dependent upon the location of the cursor within the sector;

f) detect an input signal resulting from a user-initiated cursor-select operation occuring while the cursor is in one of said two zones;

g) assign either an AM or a PM parameter depending on which of said two zones the cursor was in; and h) accept the set time value, including the assigned parameter.

24. A program product as defined in claim 23 wherein said computer system is caused to define said two zones as polygonal buttons appearing on the display screen adjacent the clock face.

25. A program product as defined in claim 24 wherein said computer system is caused to define said two zones as concentric annular zones centered on the clock face, each of said zones also being defined as constituting a time setting zone.

26. A computer program product comprising a computer usable medium having a computer readable program embodied in said medium, wherein the computer readable readable program when executed on a computer system having a display screen and a user-controlled pointing devices causes the computer system to:

a) display a graphical representation of an analog clock face on the display screen, said clock face including hour-indicating indicia, an hour hand set to an initial hour time value and a minute hand set to an initial minute time value;

b) create at least one time setting zone centered on the displayed analog clock face, said at least one time setting zone being divided into a number of sectors equal to the number of hours represented on the clock face, each sector having one boundary coincident with a first hour-indicating indicia and another boundary coincident with an adjacent hour-indicating indicia;

c) create two zones on the display screen, one of said two zones being associated with an AM parameter and the other of said two zones being associated with a PM parameter;

d) detect a first input signal occuring while the cursor is the time setting zone;

e) respond to detection of the first input signal by setting the hour hand to a time value associated with the sector within which the cursor is positioned and the minute hand to a time value dependent upon the location of the cursor within the sector;

f) detect a second input signal occurring while the cursor is in the time setting zone;

g) respond to detection of the second input signal by setting the minute hand to a time value dependent upon the change in cursor position occuring between the detection of the first and second input signals;

h) detect an input signal resulting from a user-initiated cursor-select operation occuring while the cursor is in one of said two zones;

i) respond to detection of said input signal by assigning either an AM or a PM parameter depending on which of said two zones the cursor was in; and j) accept the set time value, including the assigned parameter, in the computer system.

* * * * *